United States Patent
Ho et al.

(10) Patent No.: US 6,209,971 B1
(45) Date of Patent: Apr. 3, 2001

(54) NON FLOW-THROUGH SOLENOID FOR HEAVY VEHICLE ABS MODULATORS

(75) Inventors: Thanh Ho, Brunswick; Paul O. Szentkiralyi, Lakewood, both of OH (US)

(73) Assignee: AlliedSignal Truck Brake Systems Company, Elyrie, OH (US)

(*) Notice: Subject to any disclaimer, the term of this patent is extended or adjusted under 35 U.S.C. 154(b) by 0 days.

(21) Appl. No.: 09/108,053

(22) Filed: Jun. 30, 1998

(51) Int. Cl.$^7$ ........................................ B60T 8/36
(52) U.S. Cl. .................... 303/119.3; 303/119.2; 303/127
(58) Field of Search .............. 303/4, 119.1, 119.2, 303/119.3, 127, 128, 132, 118.1, 15, 3

(56) References Cited

U.S. PATENT DOCUMENTS

| | | |
|---|---|---|
| 3,719,401 | 3/1973 | Peruglia . |
| 3,768,875 | 10/1973 | Davis et al. . |
| 4,273,310 | 6/1981 | Ginzler . |
| 4,643,491 * | 2/1987 | McCann et al. ................. 303/118.1 |
| 4,714,300 | 12/1987 | Heess et al. . |
| 4,840,434 | 6/1989 | Leiber . |
| 5,040,853 | 8/1991 | Burgdorf et al. . |
| 5,100,208 * | 3/1992 | Angermair ........................ 303/118.1 |
| 5,118,169 * | 6/1992 | Moller .............................. 303/118.1 |
| 5,160,116 | 11/1992 | Sugiura et al. . |
| 5,388,899 | 2/1995 | Volz et al. . |
| 5,409,303 * | 4/1995 | Engelbert et al. ................ 303/118.1 |
| 5,423,602 | 6/1995 | Takahashi . |
| 5,425,575 | 6/1995 | Schmidt et al. . |
| 5,443,306 * | 8/1995 | Broome ..................................... 303/3 |
| 5,460,437 | 10/1995 | Hara . |
| 5,556,175 | 9/1996 | Hayakawa et al. . |
| 5,722,740 * | 3/1998 | Engelbert et al. ................ 303/118.1 |
| 5,725,289 | 3/1998 | Mueller et al. . |

FOREIGN PATENT DOCUMENTS 0147585   12/1983   (EP) .

* cited by examiner

Primary Examiner—Robert J. Oberleitner
Assistant Examiner—Devon Kramer

(57) ABSTRACT

A modulator valve for an ABS system for heavy duty vehicles is disclosed. It uses non flow-through solenoid valve assemblies that simplify the machining and manufacturing costs associated with the present arrangement. This eliminates complex pilot passages and also achieves a quicker acting release of the brakes during normal service braking.

16 Claims, 5 Drawing Sheets

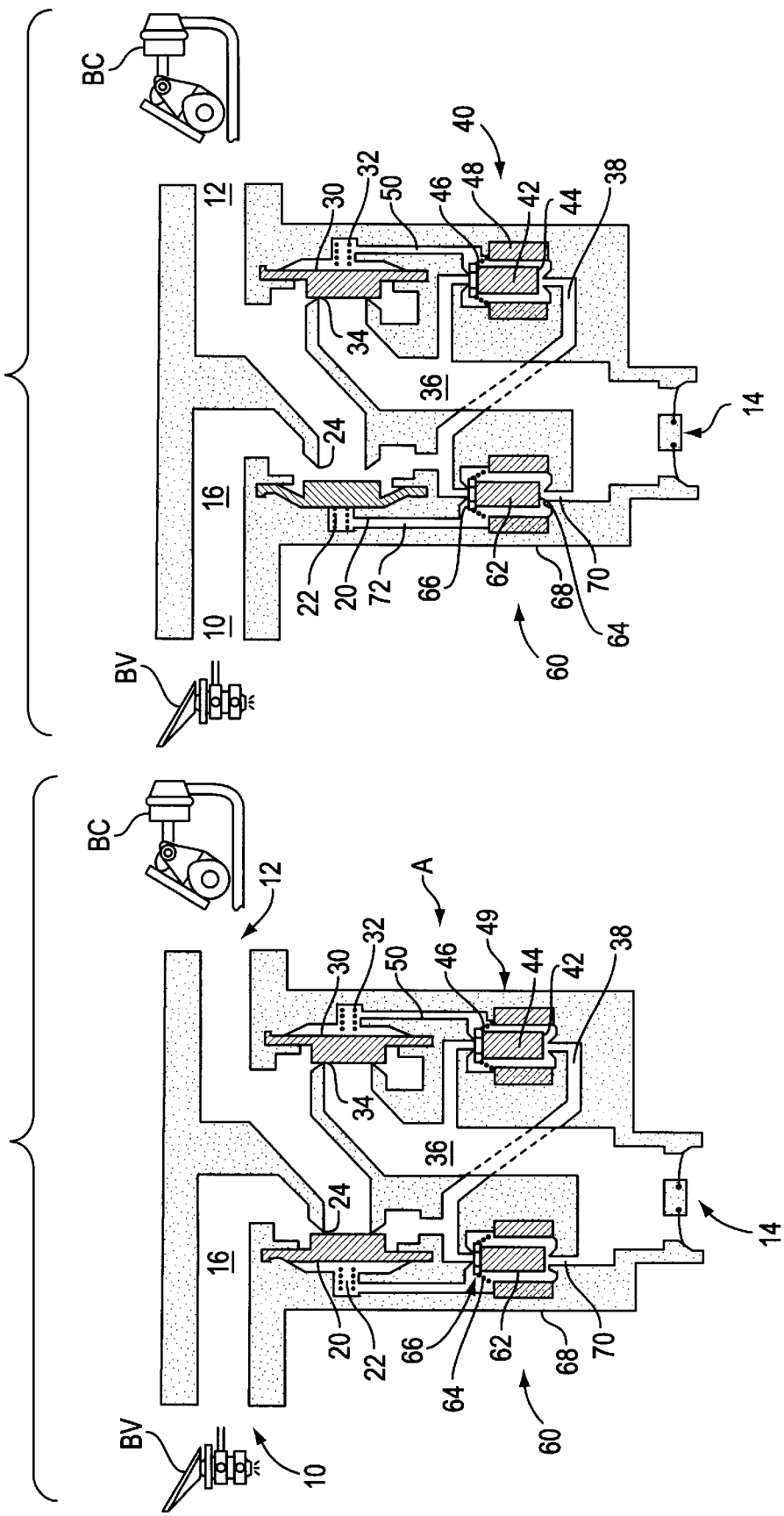

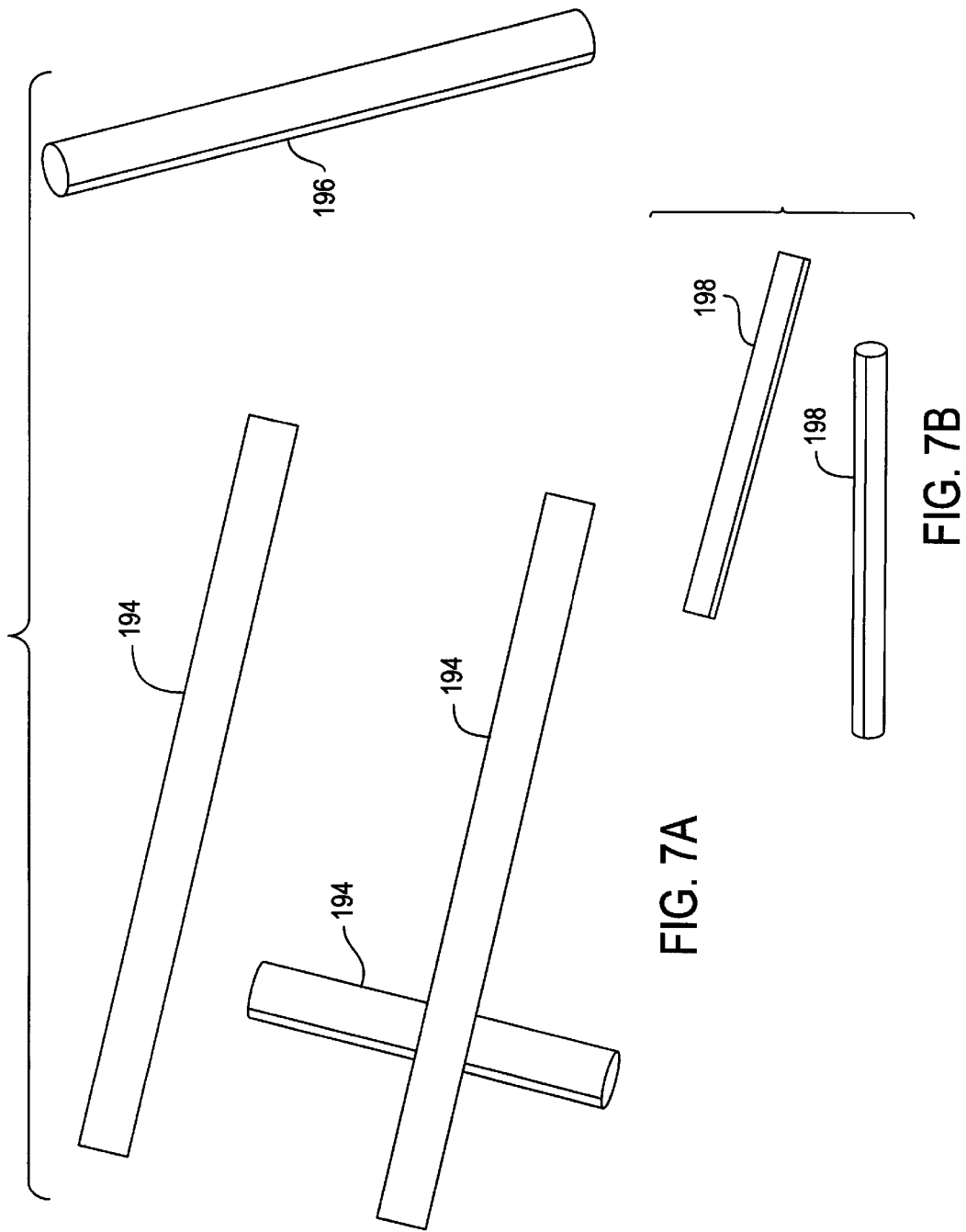

NON FLOW-THROUGH SOLENOID FOR HEAVY VEHICLE ABS MODULATORS

BACKGROUND OF THE INVENTION

The present invention relates to heavy vehicle ABS modulators that presently use flow-through solenoids with complex pilot passages. In the field relating to antilock braking systems "ABS," a modulator valve is situated between a source of air pressure and the brake chamber or actuator. The modulator is typically a three-way valve that under normal service operation selectively receives pressurized air upon depression of a brake valve and conveys the pressurized air to the brake actuators. Likewise, release of the brake valve shuts off the supply of air pressure to the brake actuators.

If an antilock event is sensed, an electronic control unit sends suitable signals to a solenoid valve assembly (usually a pair of solenoid valves) associated with the modulator. The solenoid valves provide an electro-pneumatic interface between the electronic controller and the air brake system. If an impending wheel lockup is sensed, the antilock controller immediately begins to modify brake application using the modulator. The coils associated with the respective solenoid valves are energized or de-energized in a predetermined sequence by the controller. As is known in the art, when a solenoid coil is energized, a core or shuttle is moved to either open or close an associated air passage. This either opens or closes the exhaust passage or reapplies air pressure to the brake actuator. Each of the solenoid valves is independently controlled by the electronic control unit. By opening and closing the solenoid valves, the antilock controller simulates brake "pumping" but at a rate substantially faster than the driver of a vehicle could actually pump the brakes to avoid skidding.

Although systems of this general type have met with substantial commercial success, there is always a need for improved efficiency and reduced manufacturing complexity. Associated with known arrangements is a relatively complex series of flow passages that interconnect the supply solenoid valve, exhaust solenoid valve, supply diaphragm, exhaust diaphragm, the supply or inlet port, the exhaust port, and the delivery port. Included among these complex flow passages are a series of pilot passages that interconnect the various components of the valve, i.e., pilot passages lead from opposite ends of the pair of solenoids to one of the diaphragm valves or to an exhaust passage.

Selected ones of these passages are used for connecting the flow passages to the exhaust port. The longer these passages are, the slower the reacting time in releasing the brakes. For example, when the foot or brake valve is released, it is preferred that the modulator be quickly and effectively connected to exhaust so that the brake actuators are released.

Moreover, known designs use flow-through solenoid valves which, although effective, require seals at each end and O-rings along the length thereof.

Thus, it would be desirable to provide a non flow-through solenoid valve assembly for heavy vehicle ABS modulators that overcome the noted problems.

SUMMARY OF THE INVENTION

The present invention contemplates a new and improved modulator that uses many of the same components but in a less complex manner.

According to the present invention, there is provided a pneumatic valve for controlling air flow to a brake chamber including a supply port that receives air from a source. An exhaust port provides a communication path to atmosphere and a delivery port is in communication with the brake chamber. A supply diaphragm is normally biased toward a closed position to prevent communication between the supply port and the delivery port. Similarly, an exhaust diaphragm is normally biased toward a closed position to prevent communication between the delivery port and the exhaust port. In response to an antilock event, a first solenoid valve regulates air flow between the supply port and the exhaust diaphragm. A second solenoid valve regulates air flow between the supply port and the supply diaphragm during an antilock braking event. At least one of the solenoid valves is a non flow-through valve in which only one end thereof is in fluid communication with a flow circuit.

According to another aspect of the invention, an exhaust cover that houses the first and second solenoid valves is substantially simplified.

According to another aspect of the invention, the second solenoid valve is a non flow-through solenoid in which only one end is in fluid communication with the flow circuit.

A principal advantage of the invention resides in providing an ABS modulator for heavy vehicles that has substantially reduced manufacturing complexity by reducing the number of pilot passages.

Another advantage of the invention resides in the simplified component design that results in reduced manufacturing costs.

Still another advantage of the invention is found in the quick acting release during normal service braking.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which is described in detail in the specification. The preferred embodiment is illustrated in the accompanying drawings which form a part of the specification.

FIG. 1 shows a modulator valve in a non-actuated position.

FIG. 2 illustrates the modulator valve during a service brake application.

FIGS. 7A and 7B provide a comparison of the existing pilot passage complexity (FIG. 7A) relative to that achieved with the present invention (FIG. 7B).

DETAILED DESCRIPTION OF THE PREFERRED EMBODIMENT

Figure 3:
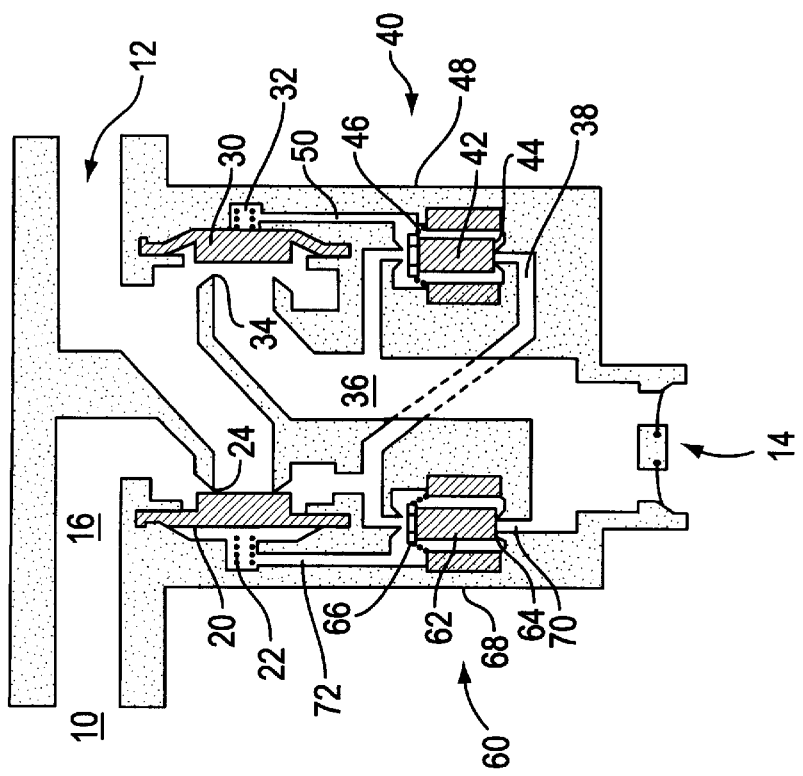
FIG. 3 shows the modulator valve in an ABS actuated mode with a supply solenoid valve actuated.

Referring now to the drawings wherein the showings illustrate the preferred embodiment of the invention and are not intended to limit the invention, the Figures show a modulator valve A that employs non flow-through solenoids to decrease complexity and reduce manufacturing costs associated therewith. More particularly, and turning first to FIGS. 1–4, a brief review of an existing, prior art arrangement of an ABS modulator is shown and described below. The modulator is a three-way valve including a valve body B having a first or supply port 10 that communicates with a source of pressurized air through a brake valve BV. The modulator includes a second or delivery or brake port 12 that communicates with the brake chamber BC of the brake actuators. In addition, a third or exhaust port 14 is provided for exhausting pressurized air to atmosphere.

As shown in FIG. 1, the supply port communicates through passage 16 with a first or supply diaphragm 20. The supply diaphragm is normally biased via a spring 22 toward a closed position with valve seat 24. This prevents communication between the supply port 10 and the delivery port 12. As shown in FIG. 2, when the brake valve is open and provides pressurized air to the supply port 10, the closing bias of the spring 22 is overcome and the supply diaphragm is moved away from the valve seat 24 to provide pressurized air to the delivery port. This allows application of the brakes during what is referred to as normal service braking.

In addition, an exhaust diaphragm 30 is urged by spring 32 toward a closed position against valve seat 34. This prevents communication of the pressurized air that enters the modulator past valve seat 24 to the delivery port with an exhaust passage 36 that leads to the exhaust port 14. Thus as shown in FIGS. 1 and 2, the exhaust diaphragm is disposed in a closed position. As will also be recognized, when the supply diaphragm is moved away from the valve seat 24 during a service brake application, pressurized air is also provided through pilot passage 38 to a first or exhaust solenoid valve 40. Particularly, the passage 38 communicates with a pusher member 42, particularly a first end 44, of the solenoid valve. As shown in FIGS. 1 and 2, the pusher member 42 is biased or urged by spring 46 toward a normally open position allowing communication between passage 38 and passage 50 that communicates with the exhaust diaphragm 30. Alternatively, when coil 48 of the solenoid valve is energized, the pusher member is urged toward a closed position preventing communication between flow passages 38, 50. When the brakes are applied during normal service application, pressurized air from pilot passage 38 communicates through the first solenoid 40, through the passage 50 and, along with the spring 32, urges the exhaust diaphragm toward a closed position. This provides a pressure assist to urge the diaphragm valve toward a closed position during normal service brake application.

As will be further recognized from FIGS. 1 and 2, passage 38 also communicates with a second or supply solenoid valve assembly 60 and supply passage 16. A pusher member 62 of the second solenoid is urged by spring 64 toward a normally closed position against valve seat 66. That is, the flow passage 38 and supply passage 16 cannot communicate with the opposite face of the diaphragm 20 unless the coil 68 moves the pusher member against the force imposed by the spring. Instead, a pilot passage 70 connects the supply diaphragm with the exhaust port through the second solenoid valve assembly 60, and through passage 72.

Although not particularly shown, it will be understood that a rapid exhaust is provided when the exhaust diaphragm 30 is urged away from its seat 34 and the brake port 12 is in communication with the exhaust port 14. In that arrangement, the brake actuators are quickly released as the pressure exits the brake chamber through the exhaust passage 36 to port 14.

Figure 4:
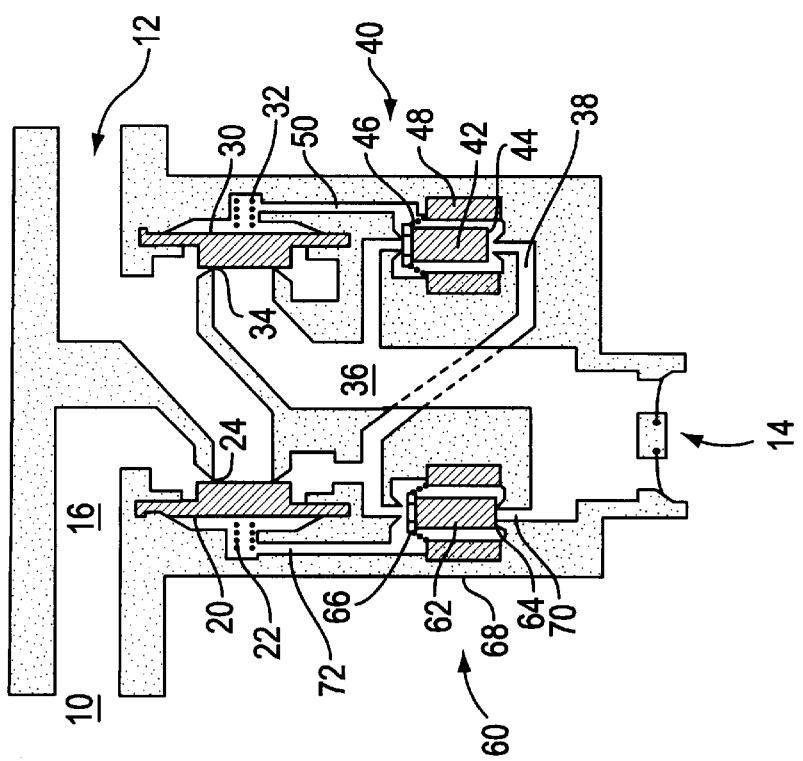
FIG. 4 illustrates the modulator with both of the first an second solenoid valves actuated.

FIGS. 3 and 4 represent the same modulator valve structure as referenced with respect FIGS. 1 and 2, and will be briefly described herein to provide an indication of the ADS operation. As indicated above, the first or exhaust solenoid valve 40 is urged toward a normally open position. The second or supply solenoid valve 60 is urged toward a normally closed position. In response to an antilock braking event, the coils 48, 68, associated with the first and second solenoid valve assemblies 40, 60, respectively, are selectively energized to urge the respective pusher members 42, 62 to overcome the bias of the springs. Thus as shown in FIG. 3, the second solenoid valve 60 is energized. This provides communication between pilot passage 38 and passage 16 and passage 72, moving the diaphragm 20 to a closed position so that a constant air pressure is provided to the delivery port 12.

FIG. 4 illustrates the energization of the first solenoid assembly (while the second solenoid valve assembly also remains energized) which closes off communication between passage 38 and passage 50. In this manner, the exhaust diaphragm 30 is urged away from its valve seat 34 thus allowing the delivery port 12 to communicate with the exhaust port 14.

Although the prior flow-through solenoid arrangement has met with substantial commercial success, the arrangement has complex passages formed in the modulator valve body. The present invention, schematically represented in FIG. 5 and structurally illustrated in FIG. 6, still achieves all of the benefits of the ABS brake operation while using non flow-through solenoids with simplified passages and a shortened exhaust cover arrangement.

Figure 5:
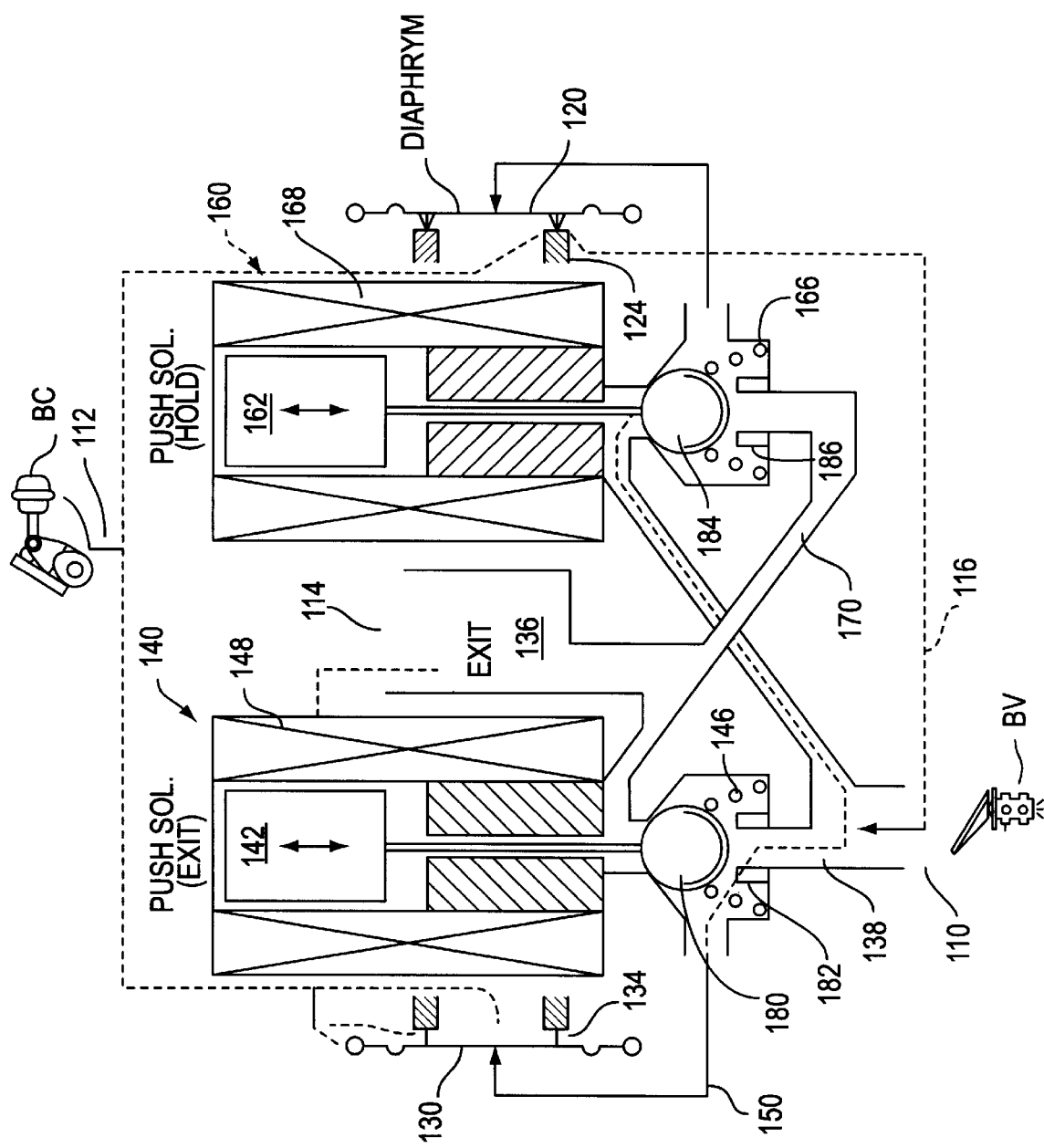
FIG. 5 is a schematic representation of the non-flow through solenoid arrangement of the present invention.

Turning first to FIG. 5, the modified modulator valve employing non flow-through valve assemblies will be described in greater detail. For purposes of comparison and brevity, like numerals with a prefix of 100 added thereto will be used to identify like elements (e.g., service port 10 will be identified as service port 110 in the modified modulator). Again, the supply or a service port 110 selectively communicates with the delivery port 112 and an exhaust port 114. More particularly, the service port 110 communicates through passage 116 with the supply diaphragm 120 that is normally biased toward a valve seat 124. Upon supply of pressurized air through the passage 116, the diaphragm is moved away from its seat to establish communication between the service port 110 and the delivery port 112. In addition, the second or exhaust diaphragm 130 is normally urged toward its associated seat 134. Pressurized air from port 110 flows through passage 138 to a first or brake solenoid valve assembly 140. It includes a coil 148 that controls movement of a pusher member 142. In the arrangement shown, a ball or check member 180 is associated with the solenoid assembly and urged toward a closed position by spring 146. This provides a normally open communication between passage 138 and 150 that extends to one side of the exhaust diaphragm 130. When energized, the coil 148 urges the pusher member 142 toward a second position (downwardly as shown in FIG. 5) pushing the ball member 180 against the bias of the spring 146 to engage seat 182. This prevents fluid communication between passages 138 and 150. As detailed above, this occurs in response to an antilock braking event where a pulsing operation is provided to the brakes.

The second or supply solenoid valve assembly 160 is in constant and direct communication with the service port 110. A ball member 184 is urged by spring 166 toward a normally closed position to prevent fluid communication between passage 138 and the supply diaphragm 120. Once the coil 168 is energized, however, the pusher member 162 urges the ball member 184, overcoming the bias of the spring, to allow pressurized air from passage 138 therepast and urge the supply diaphragm toward a closed position. At the same time, the supply diaphragm is then shut off from the exhaust passage 136 and exhaust port 114 via passage 170 when the ball 184 engages the valve seat 186.

Figure 6:
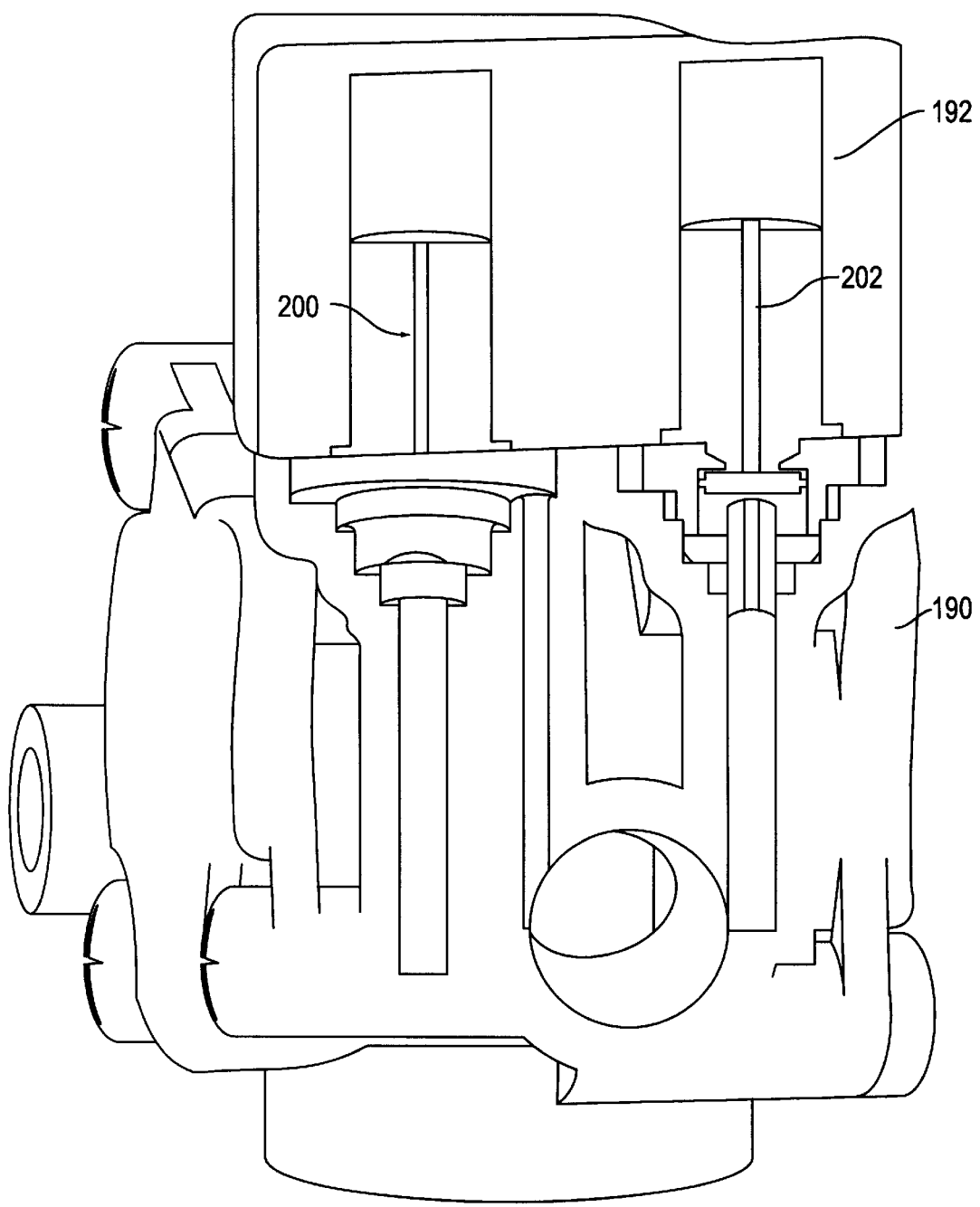
FIG. 6 is an illustration of the valve body and exhaust cover of the present invention with selected portions shown in cross-section for ease of illustration.

As is evident from FIG. 5, and additionally illustrated in FIG. 6, the solenoid assemblies 140, 160 are non-flow through solenoids. That is, only one end of the solenoid valve assemblies are in communication with the fluid circuit or flow passages. This eliminates complex pilot passages associated with the second ends of the solenoid valve assemblies (compare FIGS. 1–4). As more particularly illustrated in FIG. 6, the valve body 190 is machined to accommodate the various flow passages, diaphragms, and pilot passages formed therein. The cover 192, which now houses the solenoid valve assemblies 140, 160, is greatly simplified and secured to the valve body with a bracket (not shown). Since only one end of each solenoid valve is in communication with the flow circuit, the cover 192 is machined with blind ends or closed end passages to receive the solenoid valve assemblies therein. The open ends of the respective passages that receive the non-flow through solenoid valves are then sealed to an external surface of the valve body.

Pressurized air does not pass through the solenoids as in the prior arrangement of FIGS. 1–4. Nevertheless, the service braking in antilock brake operations as described above remains unaffected. In fact, as graphically represented in FIGS. 7A and 7B, the pilot passages associated with the prior arrangement and the modified modulator valve assembly are drastically different. In FIG. 7A, four enlarged passages are required in the modulator valve. Three are provided in the body, namely, passages 194, and a fourth passage 196 is provided in the exhaust cover. In the modified arrangement of FIG. 7B, only two pilot passages 198 are required. No pilot passages are required in the cover. Thus, substantially smaller diameter passages, and a reduced number of passages are achieved in the modified modulator of the present invention.

Moreover, the prior electromagnetic actuation of the solenoid valves is modified to a reliable electromagnetic actuation with a mechanical linkage 200, 202 which is an extension of the pusher members 142, 162 beyond the armature of the solenoid valves. The linkages engage the ball members 180, 184, as described above.

In addition, the new arrangement eliminates the valve seat being formed on the pusher member of the solenoids. As is apparent, separate valve seats 182, 186 are provided in the non flow-through arrangement described above.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. A pneumatic three way valve for controlling air from a pressurized source to a brake chamber, the valve comprising:

a valve body having a supply port in communication with a source, an exhaust port for exhausting air to atmosphere, and a delivery port in communication with a brake chamber;

a supply valve disposed between the supply port and the delivery port for selectively providing pressurized air to the brake chamber;

an exhaust valve for selectively connecting the delivery port to the exhaust port;

first and second solenoid valve assemblies that regulate operation of the supply and exhaust valves in response to an antilock braking event, each solenoid valve assembly having a first end and a second end, the solenoid valve assemblies secured to the valve body so that only said first ends of each solenoid valve assembly can be exposed to pressurized air during operation of the three-way valve whereas said second ends of each solenoid valve assembly cannot be exposed to pressurized air during operation of the three-way valve.

2. The valve of claim 1 wherein the first solenoid valve assembly is interposed between the supply port and the exhaust valve for regulating air flow therebetween during an antilock braking event.

3. The valve of claim 2 wherein the first solenoid valve assembly is in direct communication with the supply port.

4. The valve of claim 1 wherein the second solenoid valve assembly is interposed between the supply port and the supply valve for regulating air flow therebetween during an antilock braking event.

5. The valve of claim 1 wherein the supply valve is a diaphragm that selectively opens and closes a passage between the supply port and the delivery port.

6. The valve of claim 5 wherein the supply diaphragm is normally biased toward a closed position and moves toward an open position in response to pressurized air supplied to the supply port during normal service braking.

7. The valve of claim 1 wherein the exhaust valve is a diaphragm that selectively opens and closes a passage between the delivery port and the exhaust port.

8. The valve of claim 7 wherein the exhaust diaphragm is normally biased toward a closed position and moves toward an open position in response to an antilock braking event.

9. A pneumatic valve for controlling air flow to a brake chamber comprising:

a valve body having a supply port that receives air from a source, an exhaust port for exhausting air to atmosphere, and a delivery port connected to the brake chamber, and selectively connected to one another through a flow circuit;

a supply diaphragm normally biased toward a closed position preventing communication between the supply port and the delivery port and, in response to pressurized air to the supply port, moving toward an open position supplying pressurized air to the delivery port;

an exhaust diaphragm normally biased toward a closed position preventing communication between the delivery port and the exhaust port;

a first solenoid valve interposed between the supply port and the exhaust diaphragm for regulating air flow therebetween during an antilock event, the first solenoid valve being disposed in a normally open position allowing fluid communication from the inlet port to urge the exhaust diaphragm toward a closed position;

a second solenoid valve interposed between the supply port and the supply diaphragm for regulating air flow therebetween during an antilock event, the second solenoid valve being disposed in a normally closed position preventing fluid communication from the inlet port and moving toward an open position in response to an antilock event to urge the supply diaphragm toward a closed position;

one of the first and second solenoid valves being a non-flow through valve having a first end that can be in fluid communication with the flow circuit during operation of the pneumatic valve, and a second end that cannot be in fluid communication with the flow circuit during operation of the pneumatic valve.

10. The valve of claim 9 wherein both of the first and second solenoid valve assemblies are non flow-through valves in which only one end of each is in fluid communication with the flow circuit.

11. The valve of claim 9 wherein the solenoid valve assemblies are secured to the valve body by a securing member such that first ends thereof are in communication with the flow circuit.

12. The valve of claim 11 wherein a pusher member of each solenoid valve assembly is partially received in the valve body.

13. The valve of claim 9 wherein one end of the second solenoid valve assembly is in constant communication with the supply port.

14. The valve of claim 9 having a reduced number of flow passages.

15. The valve of claim 9 wherein the first and second solenoid valves each include a pusher member surrounded by a coil for selectively moving the pusher member upon energization of the coil, and a mechanical linkage interposed between the pusher member and the valve seat for actuating a valve member relative to a valve seat.

16. The valve of claim 15 wherein each solenoid valve includes a ball member interposed between the valve seat and the mechanical linkage adapted for selective engagement with the associated valve seat.

* * * * *